United States Patent
Scott et al.

(10) Patent No.: US 7,121,158 B2
(45) Date of Patent: Oct. 17, 2006

(54) SENSOR INSERTION INTO AN ACTIVE CONDUIT

(75) Inventors: Elijah J. Scott, Loveland, CO (US); Terry L. Engelhardt, Loveland, CO (US); Eugene G. Fatton, Fort Collins, CO (US)

(73) Assignee: Hach Company, Loveland, CO (US)

( * ) Notice: Subject to any disclaimer, the term of this patent is extended or adjusted under 35 U.S.C. 154(b) by 84 days.

(21) Appl. No.: 10/889,565

(22) Filed: Jul. 12, 2004

(65) Prior Publication Data

US 2005/0072253 A1    Apr. 7, 2005

Related U.S. Application Data

(60) Provisional application No. 60/507,309, filed on Sep. 30, 2003.

(51) Int. Cl.
*G01D 21/00* (2006.01)
(52) U.S. Cl. .................................... 73/866.5
(58) Field of Classification Search .............. 73/866.5
See application file for complete search history.

(56) References Cited

U.S. PATENT DOCUMENTS

| | | | | |
|---|---|---|---|---|
| 3,691,846 A | * | 9/1972 | Ingold | 73/866.5 |
| 4,096,754 A | * | 6/1978 | Beveridge et al. | 73/866.5 |
| 4,327,586 A | * | 5/1982 | Goddard | 73/866.5 |
| 4,346,611 A | * | 8/1982 | Welker | 73/866.5 |
| 4,631,961 A | * | 12/1986 | Yohe et al. | 73/866.5 |
| 4,697,465 A | * | 10/1987 | Evans et al. | 73/866.5 |
| 4,742,717 A | * | 5/1988 | Ichino | 73/866.5 |
| 4,916,797 A | * | 4/1990 | Strommen et al. | 29/426.5 |
| 5,138,755 A | * | 8/1992 | Evans et al. | 73/866.5 |
| 5,385,060 A | * | 1/1995 | Wang | 73/866.5 |
| 6,640,658 B1 | * | 11/2003 | Guerrero et al. | 73/866.5 |

OTHER PUBLICATIONS

"Technology for Water Quality and Security Monitoring" Six-CENSE™ Dascore Incorporation, [retrieved from www.dascore.com], Jacksonville, FL, Rev. 10.03.1.
"SixCENSE™ Technical Specifications" Dascore Incorporated, [retrieved from http://www.dascore.com/sixcense_tech.htm], [retrieved on May 7, 2004], Jacksonville, FL, updated Nov. 2003.
American Water Works Association, e-Journal AWWA, vol. 94, No. 8, Aug. 2002, [retrieved from http://www.awwa.org/communications/journal/2002/August/News/techtalk802.cfm.] [retrieved on May 13, 2004].
"In-line monitoring of distribution system now possible with Dascore Six-CENSE™," [retrieved on Jun. 27, 2002], [retrieved from http://www.dascore.com].

* cited by examiner

*Primary Examiner*—Hezron Williams
*Assistant Examiner*—Nashmiya Fayyaz
(74) *Attorney, Agent, or Firm*—The Ollila Law Group LLC

(57) ABSTRACT

A method and apparatuses for installing a sensor on an active conduit is disclosed. An adaptor is attached to a corporation stop valve that has been installed onto an active conduit in the closed position. A sensor is positioned at a first position in the adaptor forming a seal between the sensor and adaptor. At the first position the sensor is automatically inhibited from moving further into the adaptor. The corporation stop valve is opened and the sensor is further inserted into the adaptor through the open corporation stop valve and into the active conduit.

11 Claims, 7 Drawing Sheets

*3A*

*3B*

*3C*

*3D*

*4A*

*4B*  *4C*

5A

5B

5C

SENSOR INSERTION INTO AN ACTIVE CONDUIT

RELATED APPLICATIONS

This application claims the benefit of U.S. Provisional Application No. 60/507,309, filed Sep. 30, 2003 with inventor Elijah Scott.

BACKGROUND OF THE INVENTION

1. Field of the Invention

The invention is related to the field of sensors, and in particular, to the insertion of a sensor into a live conduit.

2. Statement of the Problem

Sensors are used to measure the characteristics of various fluids. For example, a sensor may be placed in water to measure the pressure, temperature, or other characteristics of the water. Industrial processes use piping to transport fluid (gas or liquid) as a part of the process. Sensors are placed in these pipes to measure characteristics that are important to the process. If the process is in existence before the sensors are placed, then the pipe is taken out of active service, so the sensors may be placed in the pipe. The pipe is then returned to active service.

Corporation stop valves have been developed to tap active pipes. When open, the corporation stop valve diverts fluid flow away from the existing pipe and into the tapped pipe. Unfortunately, corporation stop valves have not been effectively used to insert multi-parameter sensors into an active pipe.

SUMMARY OF THE INVENTION

A method and apparatuses for installing a sensor on an active conduit is disclosed. An adaptor is attached to a corporation stop valve that has been installed onto an active conduit in the closed position. A sensor is positioned at a first position in the adaptor forming a seal between the sensor and adaptor. At the first position the sensor is automatically inhibited from moving further into the adaptor. The corporation stop valve is opened and the sensor is further inserted into the adaptor through the open corporation stop valve and into the active conduit.

DESCRIPTION OF THE DRAWINGS

The same reference number represents the same element on all drawings.

DETAILED DESCRIPTION OF THE INVENTION

FIGS. 1–6 and the following description and exhibits depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
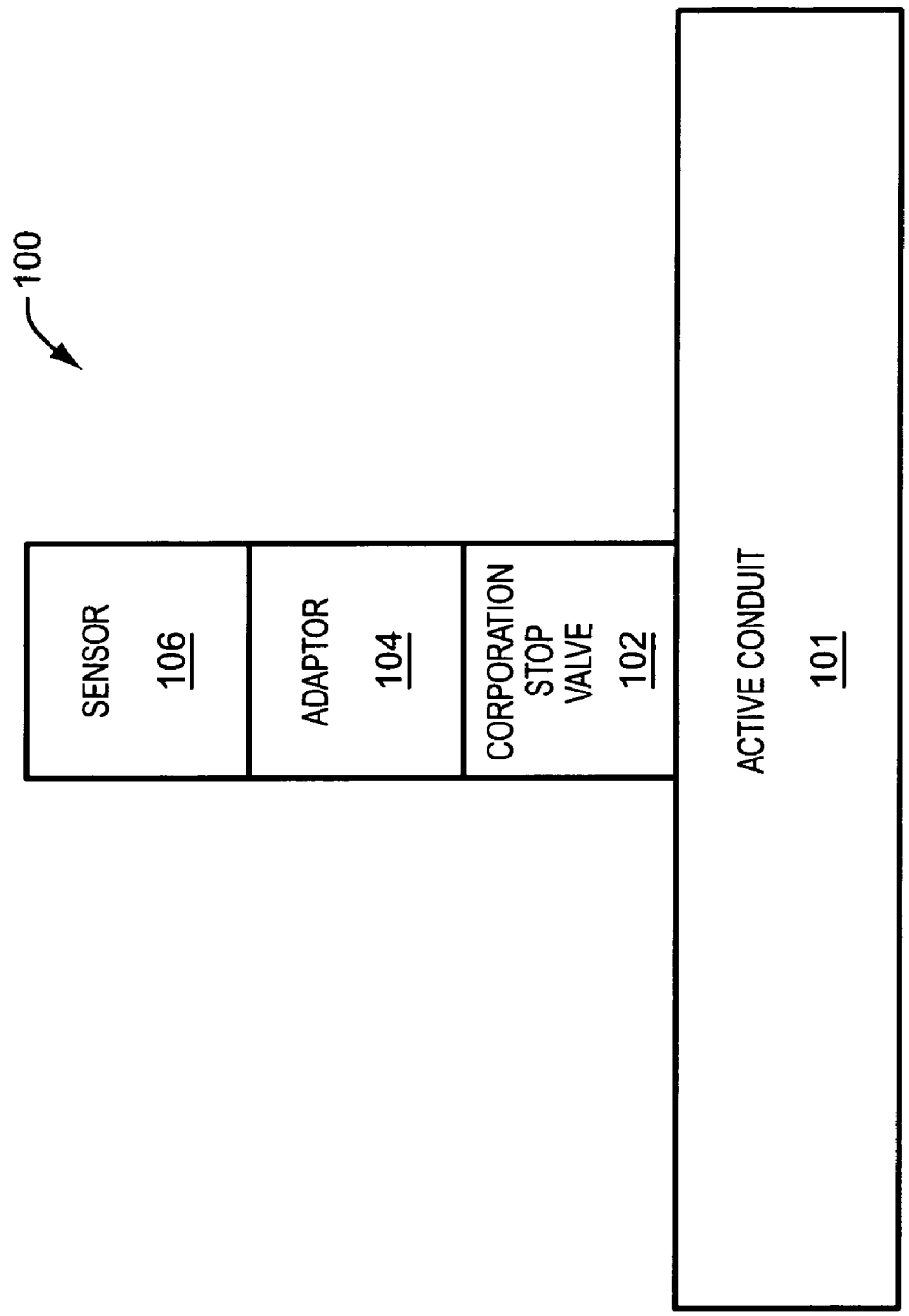
FIG. 1 illustrates a block diagram of a sensor system in an example of the invention.

FIG. 1 illustrates sensor system 100 in an example of the invention. Sensor system 100 includes corporation stop valve 102, adaptor 104, and sensor 106. Active conduit 101 could be any fluid path where the fluid is currently flowing through the conduit under normal operating conditions. One example of active conduit 101 is a water pipe that is actively carrying water from a water supply to water consumers. Corporation stop valve 102 could be a conventional valve that is configured for tapping active conduit 101. Corporation stop valve 102 is installed in the valve-closed position.

Adaptor 104 provides an interface between corporation stop valve 102 and sensor 106.

Sensor 106 is configured to measure characteristics of the fluid in active conduit 101. Sensor 106 may measure pressure, temperature, pH, conductivity, ORP, dissolved oxygen, turbidity, chlorine, total organic carbon, or some other parameter of the fluid. One example of sensor 106 is a sonde with multiple probes.

The following method describes installing sensor 106 on active conduit 101. Corporation stop valve 102 is attached to active conduit 101 to form a first seal between active conduit 101 and corporation stop valve 102. Adaptor 104 is attached to corporation stop valve 102 to form a second seal between adaptor 104 and corporation stop valve 104.

Sensor 106 is positioned to a first position in adaptor 104. At the first position, a third seal has formed between sensor 106 and adaptor 104, but the bottom of sensor 106 has not yet reached closed corporation stop valve 102. In response to sensor 106 being in at the first position in adaptor 104, a first mechanism is automatically activated to inhibit further positioning of sensor 106 toward active conduit 101, and an indication to an operator is automatically generated. Advantageously, this should prevent the operator from accidentally crushing sensor 106 against closed corporation stop valve 102, and this also notifies the operator that the corporation stop valve 102 needs to be opened before proceeding.

In response to the indication, the operator opens corporation stop valve 102, deactivates the first mechanism, and positions sensor 106 to a second position. At the second position, sensor 106 extends through open corporation stop valve 102 toward active conduit 101. When sensor 106 is at the second position, a second mechanism is activated to lock the sensor 106 at the second position.

Sensor 106 and adaptor 104 are configured to allow sensor 106 to be removed from the active conduit for maintenance, for example cleaning. To remove sensor 106, the second mechanism is de-activated, unlocking sensor 106 from the second position. Sensor 106 is moved from the second position back to the first position where the first mechanism is automatically activated. While the sensor 106 is at the first position the corporation valve is closed. The first mechanism is de-activated and the sensor 106 is removed from the adaptor by moving the sensor away from the first and second position. Sensor 106 and adaptor 104 are configured to vent a portion of the fluid in active conduit 101 if sensor 106 is positioned away from the first and second position when corporation stop valve 102 is still open. This venting warns the operator that corporation stop valve 102 is still open. The amount of warning fluid that is vented is restricted for safety.

Adaptor 104 is configured with a valve to restrict vacuum lock when sensor 106 is removed from adaptor 104. Adaptor 104 is also configured with a sample port to allow sampling of the fluid in active conduit 101.

In one example of the invention, adaptor 104 is screwed into corporation stop valve 102. Prior to screwing in adaptor 104, a sealing ring is inserted and is subsequently compressed as adaptor 104 is tightened onto corporation stop valve 102. The sealing ring conforms to the shape of corporation stop valve 102 on one side and to adaptor 104 on the other side. Sensor 106 is then screwed into adaptor 104. Lanyards are attached to sensor 106 and adaptor 104 to prevent sensor 106 from blowing off under pressure and injuring an operator. Sensor 106 has a spring-loaded lock-pin that automatically seats in a groove in adaptor 104 when sensor 106 reaches the first position. This mechanism prevents sensor 106 from moving any further toward corporation stop valve 102. The spring-loaded lock-pin also provides an audible click to the installer when it seats in the groove. To continue, the installer opens corporation stop valve 102 and manually removes the spring loaded stop-pin from the groove. With the stop-pin removed, the installer continues to screw sensor 106 further into adaptor 104. When sensor 106 reaches the second position, the installer positions another lock-pin into adaptor 104 that should prevent sensor 106 from being accidentally removed while corporation stop valve 102 is still open. The installer also plugs a communication cable or activates some other communication link in sensor 106.

To provide the warning vent, a length of sensor 106 has a restricted diameter. If sensor 106 is removed while corporation stop valve 102 is still open, the restricted diameter defeats the third seal between an o-ring in adaptor 104 and the outside of sensor 106. The defeated seal allows a small portion of the fluid from active conduit 101 to vent and warn the operator that corporation stop valve 102 is still open. The restricted diameter is designed to vent only a relatively small and safe portion of the warning fluid.

Sensor 106 may have a protective guard at the bottom to protect the sensor probes.

Sensor 106 and adaptor 104 could be comprises of 316 stainless steel.

Adaptor 104 and sensor 106 could be integrated together into a single device. Adaptor 106 and corporation stop valve 102 could be integrated together into a single device. Corporation stop valve 102, adaptor 104, and sensor 106 could be integrated together into a single device.

Figure 2A:
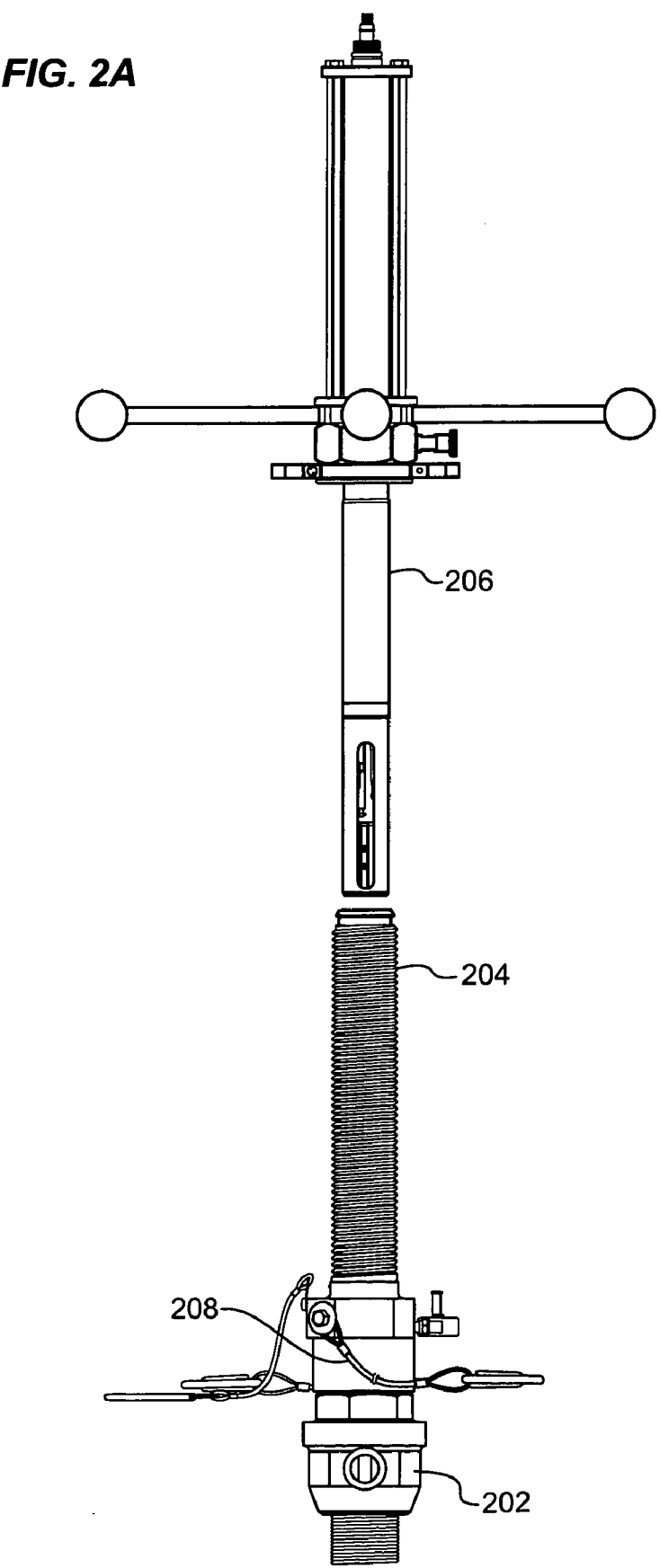
FIG. 2A is a side view of an assembly drawing of one example embodiment of the invention.
Figure 2B:
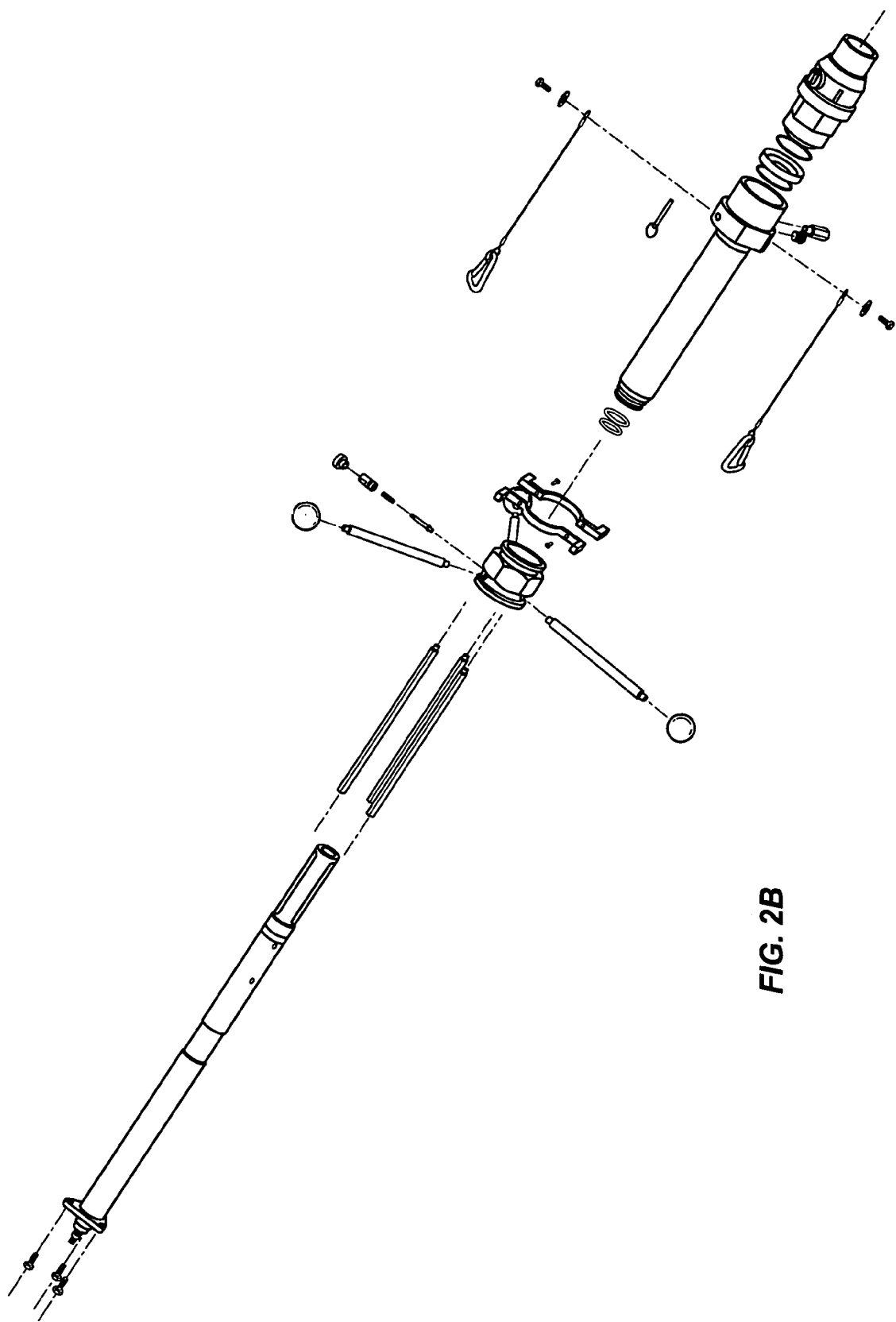
FIG. 2B is a perspective view of an exploded assembly drawing of one example embodiment of the invention.
Figure 3:
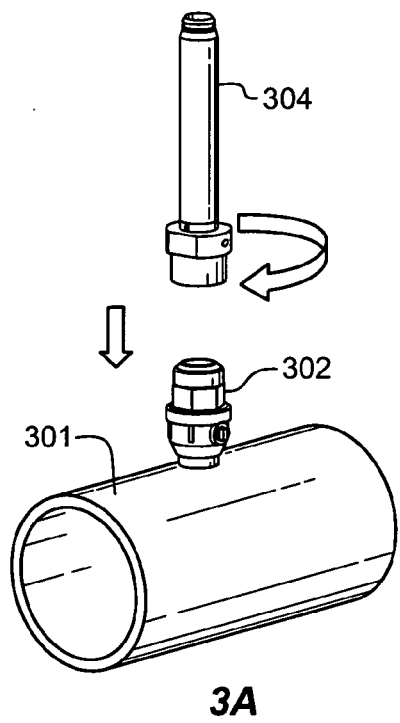
FIG. 3A is a perspective view of an adaptor positioned above a corporation stop installed in a segment of an active conduit in an example embodiment of the invention.
FIG. 3B is a perspective view of an adaptor installed onto a corporation stop that is installed in a segment of an active conduit in an example embodiment of the invention.
FIG. 3C is a perspective view of a sensor positioned above an adaptor, ready for insertion into the adaptor in an example embodiment of the invention.
FIG. 3D is a perspective view of a sensor inserted in an adaptor in an example embodiment of the invention.
Figure 3:
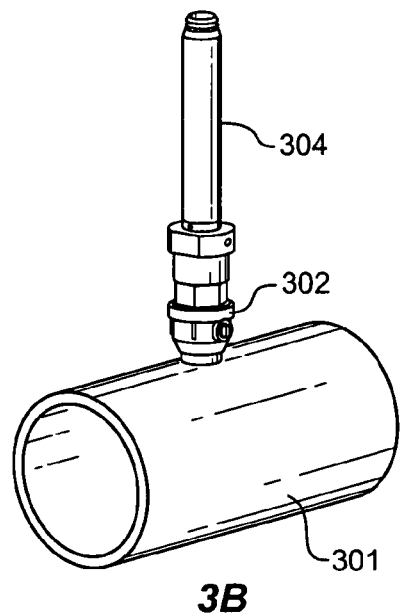
Figure 3:
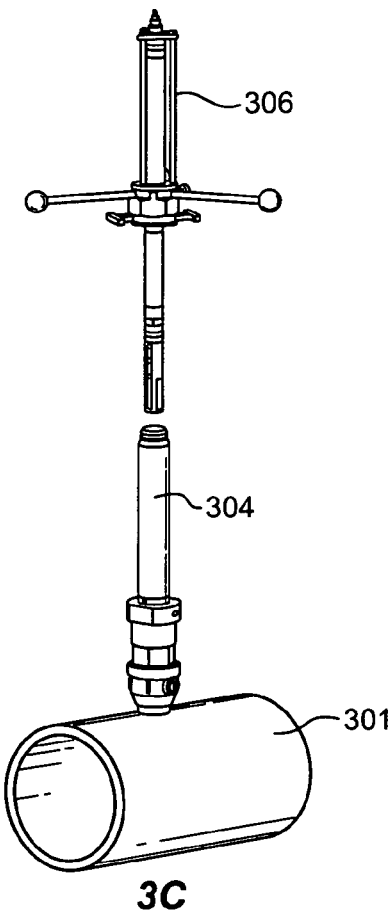
Figure 3:
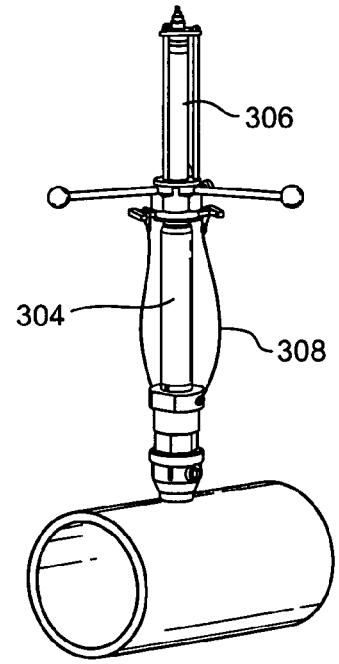
Figure 4:
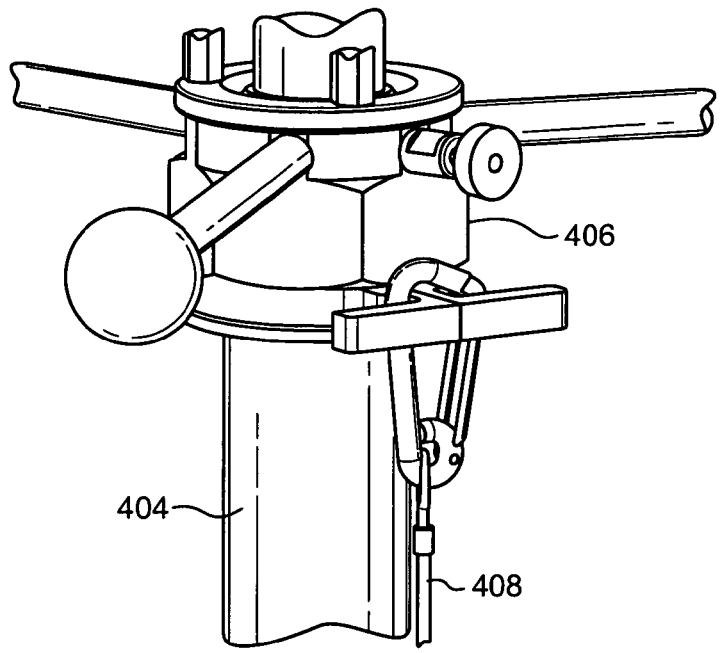
FIG. 4A is a close up perspective view of a lanyard clipped to a sensor in an example embodiment of the invention.
FIGS. 4B and 4C are perspective views of a sensor being moved into a second position in an example embodiment of the invention.
Figure 4:
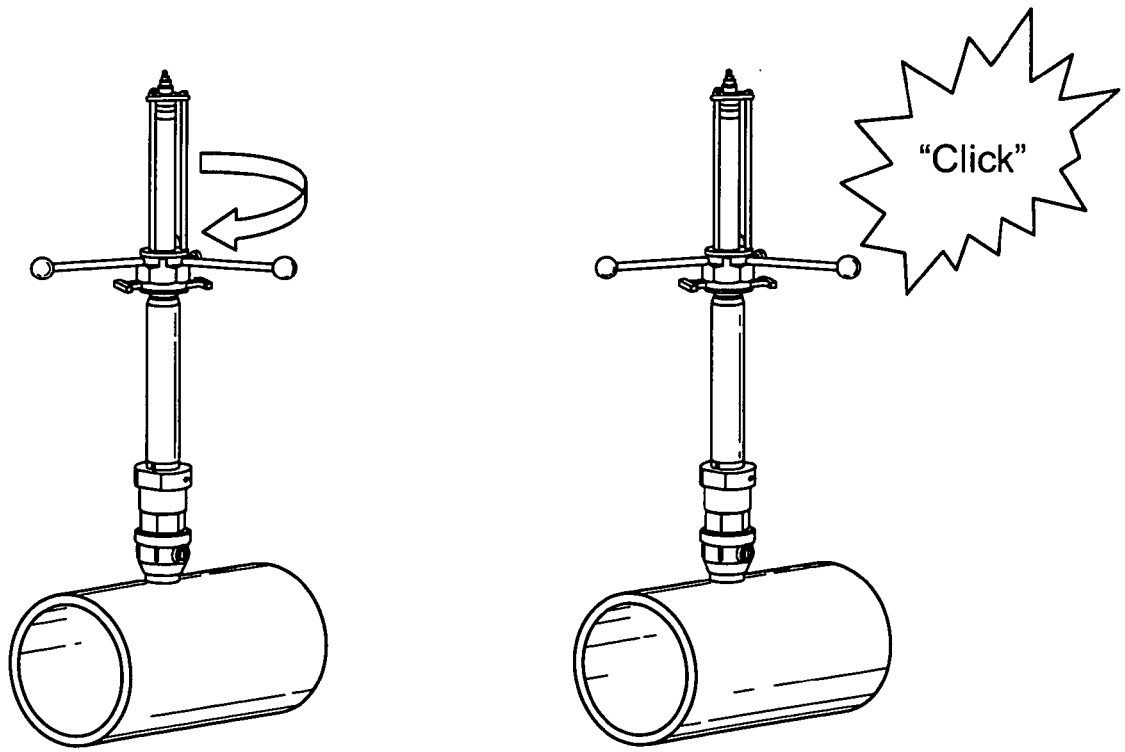
Figure 5:
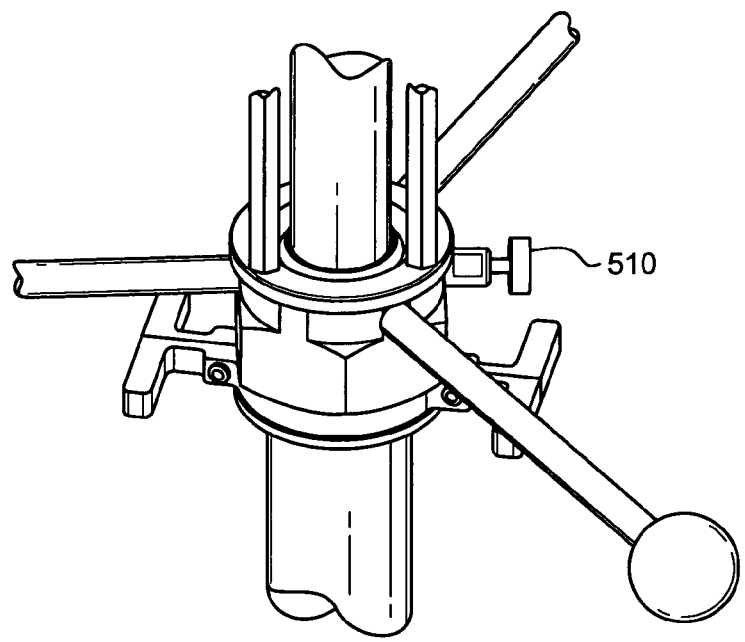
FIG. 5A is a close up perspective view of a spring loaded pen disengaged to allow the sensor to be moved to the second position in an example embodiment of the invention.
FIG. 5B is a perspective view of a sensor installed at the second position inside an adaptor that is attached to a corporation valve installed in a segment of an active conduit in an example embodiment of the invention.
FIG. 5C is a side view of a sensor installed at the second position inside an adaptor that is attached to a corporation valve installed in a segment of an active conduit in an example embodiment of the invention.
Figure 5:
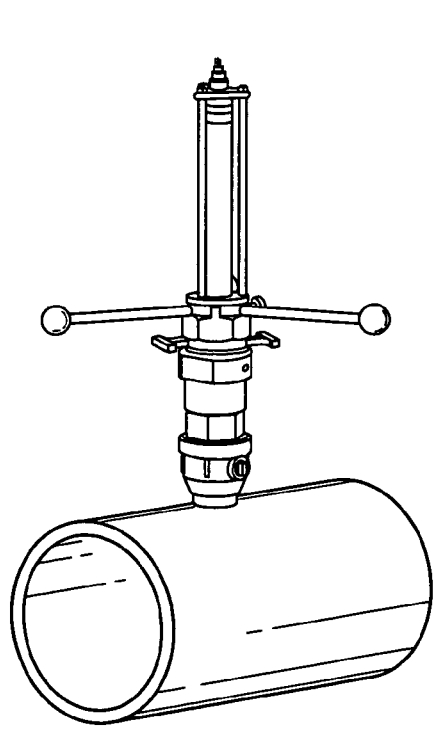
Figure 5:
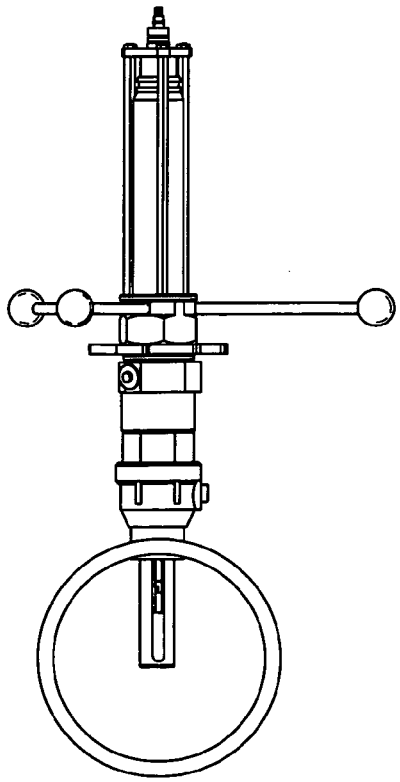

FIG. 2A is an assembly drawing of one embodiment of the invention. FIG. 2A comprises a corporation stop 202, an adaptor 204, a sensor 206, and lanyards 208. The adaptor 204 is shown already attached to corporations stop 202. The lanyards 208 are shown already attached to adaptor 204. Sensor 206 is shown positioned above the adaptor 204 just before insertion of sensor 206 into adaptor 204. FIG. 2B is a perspective view of an exploded assembly drawing of one embodiment of the invention FIGS. 3, 4, and 5 pictorially depict the assembly of one example embodiment of the invention as it is installed in an active conduit. FIG. 3A is a perspective view of the adaptor 304 positioned above a corporation stop 302 installed in a segment of an active conduit 301. The corporation stop 302 is in the closed position. The adaptor 304 is configured to attach to the corporation stop 302 forming a seal between the corporation stop 302 and the adaptor 304. In one embodiment the adaptor 304 is configured to screw onto the corporation stop 302 but other attachment methods may be used. FIG. 3B shows the adaptor 304 installed onto the corporation stop 302. FIG. 3C shows the sensor 306 positioned above adaptor 304, ready for insertion into adaptor 304. FIG. 3D shows sensor 306 inserted into adaptor 304 with lanyards 308 attached. FIG. 4A is a close up perspective view of lanyard 408 clipped to sensor 406. Lanyards 408 are attached between sensor 406 and adaptor 404 as a safety feature to prevent sensor 406 from being blown out of adaptor 404 under the pressure of the material in the active conduit. Once the sensor 406 is inserted into adaptor 404, the sensor is moved to a first position as shown in FIG. 4B. In one example embodiment, the sensor is moved into the first position by rotating a nut on sensor 406 adapted to engage a threaded outer diameter of adaptor 404. Other methods may be used to position the sensor with respect to the adaptor, for example levers, hydraulics, rack and pinion gears, or the like. Any device that allows a mechanical advantage that can overcome the pressure of the material in the active conduit may be used to position the sensor with respect to the adaptor. When sensor 406 reaches the first position, a device automatically inhibits further motion of sensor 406 into adaptor 404 towards corporation valve. In one example embodiment the device is a spring loaded pin that snaps into a groove when the sensor reaches the first position. When the spring loaded pin snaps into the groove a click is generated, warning the user that the sensor has reached the first position as shown in FIG. 4C. Other devices may be used to inhibit the motion of the sensor 406 into adaptor 404, for example a removable stop similar to those used on child-proof caps.

Once the sensor 406 is located at the first position, the corporation valve is opened (not shown). With the corporation valve open, the device is disengaged and the sensor is moved into a second position. FIG. 5A shows one example embodiment of the invention where the device is disengaged by pulling the spring loaded pin 510 out of the groove. In one example embodiment, the sensor 506 is moved from the first position to the second position by continuing the rotation of the nut on the sensor 506 that is engaged with the threaded outer diameter of the adaptor 504. When the sensor is in the second position the sensor is fully inserted into the adaptor and extends into the active area of the conduit (see FIGS. 5B and 5C). Once the sensor is in the second position it may be locked in place. In one embodiment, the sensor is locked in place using a locking pin (not shown).

In one example embodiment of the invention, the sensor is configured to be serviced multiple times during use. The sensor is service by reversing the procedure used to install the sensor into the adaptor. Once the sensor has been removed from the adaptor, the sensor may be serviced, for example by cleaning the sensors, replacing a battery, emptying a data store, or the like. Once the sensor has been serviced the sensor may be re-installed back into the adaptor. To aid in this process, a wear ring may be installed inside the adaptor configured to fit between the inside diameter of the adaptor and the outside diameter of the sensor. The Busak+Shamban Company's Slydring® wear ring could be used in an example embodiment of the invention. The wear ring guilds the sensor as it is being inserted into the adaptor and as the sensor is moved from the first position to the second position. Without the guild ring the sensor may rub against the inside of the adaptor and cause galling between the two surfaces.

Figure 6:
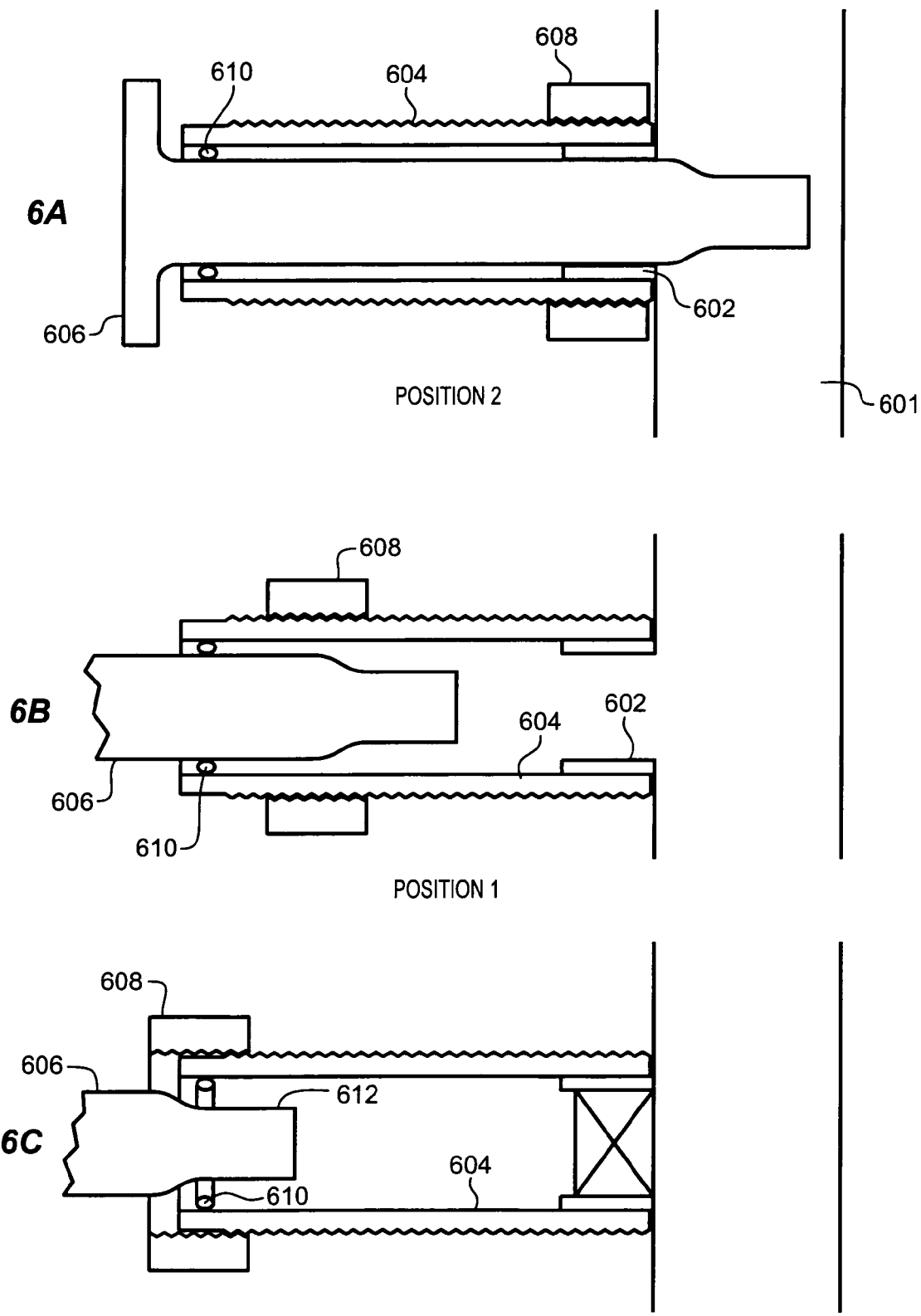
FIG. 6A is a sectional view of a sensor installed at a position that is moved away from the first and second position inside an adaptor, showing the restricted diameter defeating the o-ring seal in an example embodiment of the invention.
FIG. 6B is a sectional view of a sensor installed at the first position inside the adaptor in an example embodiment of the invention.
FIG. 6C is a sectional view of a sensor installed at the second position inside the adaptor in an example embodiment of the invention.

FIG. 6 shows one example embodiment of the invention where a restricted diameter in the sensor allows material from the active conduit to vent when the sensor is moved away from the first and second positions while the corporation stop valve is open. FIG. 6A shows the sensor 606 at the second position fully inserted into the adaptor 604 and extending through the open corporation stop 602 into the active conduit 601. The o-ring 610 forms a seal between sensor 606 and adaptor 604. A nut 608 on sensor 606 has engaged the treaded outer diameter of the adaptor 604. FIG. 6B shows the sensor 606 at the first position with the o-ring 610 still forming a seal between the sensor 606 and the adaptor 604. The corporation stop valve is shown in the open position. FIG. 6C shows the sensor 606 moved away from the first and second positions where a restricted diameter 612 on the sensor 606 no longer forms a seal using o-ring 610 between the restricted diameter 612 and the adaptor 604. FIG. 6C shows the corporation stop valve in the proper closed position. However if the corporation stop valve was in the open position, material from the active conduit would be vented between the restricted diameter 612 passed o-ring 610 into the open warning the user that the corporation stop valve needed to be closed.

The invention claimed is:

1. A method of installing a sensor on an active conduit, the method comprising:

attaching an adaptor to a corporation stop valve to form a first seal between the adaptor and the corporation stop valve, where the corporation stop valve is installed on the active conduit;

positioning a sensor to a first position in the adaptor, wherein at the first position, a second seal has formed between the sensor and the adaptor and the sensor has not reached the corporation stop valve;

in response to the sensor being in the adaptor at the first position, automatically inhibiting further positioning of the sensor toward the active conduit with an inhibition; and opening the corporation stop valve, removing the inhibition preventing further positioning of the sensor towards the active conduit, and positioning the sensor to a second position where the sensor extends through the open corporation stop valve into the active conduit wherein the sensor is configured to measure characteristics of a material in the active conduit;

wherein the sensor and the adaptor are configured to vent a restricted portion of the material in the active conduit when the sensor is positioned away from the first and second positions and when the corporation stop valve is open to warn an operator that the corporation stop valve is open by means of breaking the second seal between the sensor and the adaptor.

2. The method of claim 1 wherein automatically inhibiting further positioning of the sensor toward the active conduit comprises hitting a stop.

3. The method of claim 1 wherein automatically inhibiting further positioning of the sensor toward the active conduit comprises allowing a spring-loaded lock-pin to automatically engage a seat.

4. The method of claim 3 wherein removing the inhibition comprises manually disengaging the pin.

5. The method of claim 1 further comprising locking the sensor at the second position.

6. The method of claim 1 further comprising installing a lanyard between the sensor and the adaptor to inhibit positioning of the sensor away from the active conduit.

7. The method of claim 1 wherein a length of the sensor has a restricted diameter to vent a portion of the fluid in the active conduit when the sensor is positioned is away from the first position and the corporation stop valve is open.

8. The method of claim 1 wherein the sensor is configured to measure temperature and pressure of the material in the active conduit.

9. The method of claim 1 wherein the sensor is configured to be removed from the adaptor for sensor maintenance by repositioning the sensor back to the first position, closing the corporation stop valve, and then removing the sensor from the adaptor.

10. The method of claim 1 wherein the sensor is moved from the first position to the second position by screwing a portion of the sensor along threads on the adaptor.

11. The method of claim 1 where the sensor comprises a multi-parameter sonde.

* * * * *

UNITED STATES PATENT AND TRADEMARK OFFICE
CERTIFICATE OF CORRECTION

PATENT NO.         : 7,121,158 B2                                              Page 1 of 1
APPLICATION NO.    : 10/889565
DATED              : October 17, 2006
INVENTOR(S)        : Elijah J. Scott, Terry L. Englehardt and Eugene G. Fatton It is certified that error appears in the above-identified patent and that said Letters Patent is hereby corrected as shown below:

Title Page, Item (75) inventor replace "Elijah J. Scott" with --Elijah L. Scott--.

Signed and Sealed this

Sixth Day of March, 2007

JON W. DUDAS
*Director of the United States Patent and Trademark Office*